(12) United States Patent
Huang

(10) Patent No.: US 6,245,417 B1
(45) Date of Patent: Jun. 12, 2001

(54) MAGNETIC RECORDING MEDIUM COMPRISING MULTILAYERED CARBON-CONTAINING PROTECTIVE OVERCOATS

(75) Inventor: Liji Huang, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/065,014

(22) PCT Filed: Oct. 8, 1997

(86) PCT No.: PCT/US97/18121

§ 371 Date: Apr. 21, 1999

§ 102(e) Date: Apr. 21, 1999

(87) PCT Pub. No.: WO99/03099

PCT Pub. Date: Jan. 21, 1999

Related U.S. Application Data
(60) Provisional application No. 60/052,187, filed on Jul. 10, 1997.

(51) Int. Cl.[7] ..................................................... G11B 5/725
(52) U.S. Cl. ........................... 428/216; 428/336; 428/408; 428/694 TC; 428/694 TF; 428/694 TP; 428/698; 428/900
(58) Field of Search ................................. 428/216, 336, 428/408, 694 TC, 694 TF, 694 TP, 698, 900

(56) References Cited

U.S. PATENT DOCUMENTS

| | | | |
|---|---|---|---|
| 5,045,165 | * | 9/1991 | Yamashita ..................... 204/192.16 |
| 5,364,690 | * | 11/1994 | Takahashi et al. .................. 428/212 |
| 5,567,512 | * | 10/1996 | Chen et al. ......................... 428/332 |
| 5,589,263 | | 12/1996 | Ueda et al. ......................... 428/336 |
| 5,607,783 | | 3/1997 | Onodera .......................... 428/694 T |
| 5,637,393 | | 6/1997 | Ueda et al. ......................... 428/332 |
| 5,773,124 | * | 6/1998 | Ishikawa et al. ................... 428/141 |
| 5,785,825 | * | 7/1998 | Hwang et al. ................. 204/192.16 |
| 5,837,357 | * | 11/1998 | Matsuo et al. ..................... 428/212 |
| 5,855,746 | * | 1/1999 | Prabhakara et al. ........... 204/192.16 |
| 5,942,317 | * | 8/1999 | White .................................. 428/216 |

FOREIGN PATENT DOCUMENTS 62-246129 * 10/1987 (JP) .

* cited by examiner

*Primary Examiner*—Stevan A. Resan
(74) *Attorney, Agent, or Firm*—McDermott, Will & Emery

(57) ABSTRACT

A magnetic recording medium is provided with multilayered carbon-containing protective overcoats having different surface polarities and electrical conductivities, thereby enabling optimum performance to be tailored for different drive programs. Embodiments include a first protective overcoat comprising hydrogenated carbon and a second protective overcoat comprising graphitic carbon or amorphous carbon nitride.

19 Claims, 2 Drawing Sheets

MAGNETIC RECORDING MEDIUM COMPRISING MULTILAYERED CARBON-CONTAINING PROTECTIVE OVERCOATS

RELATED APPLICATION

This application claims priority from provisional patent application Serial No. 60/052,187 filed Jul. 10, 1997, the entire disclosure of which is hereby incorporated by reference herein.

TECHNICAL FIELD

The present invention relates to a magnetic recording medium, particularly a rotatable magnetic recording medium, such as a thin film magnetic disk cooperating with a magnetic transducer head. The invention has particular applicability to high areal recording density magnetic recording media designed for drive programs having reduced flying heights, or pseudocontact/proximity recording.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

A typical longitudinal recording medium is depicted in FIG. 1 and comprises a substrate 10, typically an aluminum (Al)-alloy, such as an aluminum-magnesium (Al—Mg)-alloy, plated with a layer of amorphous nickel-phosphorus (NiP). Alternative substrates include glass, glass-ceramic materials and graphite. Substrate 10 typically contains sequentially deposited on each side thereof a chromium (Cr) or Cr-alloy underlayer 11, 11', a cobalt (Co)-base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective overcoat 13, 13', typically containing carbon, are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms. The lubricant is usually dissolved in an organic solvent applied and bonded to the carbon overcoat of the magnetic recording medium by techniques such as thermal treatment, ultraviolet (UV) irradiation and soaking. A significant factor in the performance of a lubricant topcoat is the bonded lube ratio which is the ratio of the amount of lubricant bonded directly to the carbon overcoat of the magnetic recording medium to the amount of lubricant bonded to itself or to a mobile lubricant. Desirably, the bonded lube ratio should be high to realize a meaningful improvement in stiction and wear performance of the resulting magnetic recording medium.

The escalating requirements for high areal recording density impose increasingly greater requirements on thin film magnetic media in terms of coercivity, stiction, squareness, low medium noise and narrow track recording performance. In addition, increasingly high areal recording density and large-capacity magnetic disks require increasingly smaller flying heights, i.e., the distance by which the head floats above the surface of the disk in the CSS drive (head-disk interface). For conventional media design, a decrease in the head to media spacing increases stiction and drive crash, thereby imposing an indispensable role on the carbon-protective overcoat.

There are various types of carbon, some of which have been employed for a protective overcoat in manufacturing a magnetic recording medium. Such types of carbon include hydrogenated carbon, graphitic carbon or graphite and carbon nitride. These types of carbon are well known in the art and, hence, not set forth herein in great detail. See, for example, L. J. Huang et al., "Structure of Nitrogenated Carbon Overcoats on Thin Film Hard Disks," IEEE Transaction on Magnetics, Vol. 33, 1997; L. J. Huang et al., "Characterization of the head-disk interface for proximity recording," IEEE Transaction on Magnetics, 1997, Vol. 33, pp. 3112–3114; and Tsai et al., "Character Review Characterization of diamondlike carbon films and their application as overcoats on thin-film media for magnetic recording," J. Vac. Sci. Technol., A5(6), Nov/Dec, 1987, pp. 3287–3311.

Generally, hydrogenated carbon has a hydrogen concentration of about 5 at.% to about 40 at.%, typically about 20 at.% to about 30 at. %, and does not bond well to a subsequently applied lubricant topcoat by virtue of the passivation of carbon dangling bonds by hydrogen. Accordingly, it is difficult to effectively bond a lubricant topcoat to a hydrogenated carbon protective overcoat at a suitable thickness. Hydrogenated carbon has a lower conductivity due to the elimination of the carbon band-gap states by hydrogen. Hydrogenated carbon also provides effective corrosion protection to an underlying magnetic layer.

Amorphous carbon nitride, sometimes referred to as nitrogenated carbon, generally has a nitrogen to hydrogen concentration ratio of about 5:20 to about 30:0. Amorphous carbon nitride generally has more carbon band-gap states than hydrogenated carbon and, hence, a higher conductivity. In addition, amorphous carbon nitride contains more dangling bonds than hydrogenated carbon, which dangling bonds promote interactions between lubricant and carbon and, hence, enable the application of a thicker bonded lubricant topcoat. Graphitic carbon or graphite contains substantially no hydrogen and nitrogen and has less band-gap states vis-à-vis nitrogenated carbon but more band-gap states than hydrogenated carbon.

The drive for high areal recording density and, consequently, reduced flying heights, challenges the limitations of conventional practices in manufacturing a magnetic recording medium containing a carbon protective overcoat. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions from underlying layers into the lubricant topcoat and to the surface of the magnetic recording medium forming defects such as asperities. A protective overcoat must also exhibit the requisite surface polarity to enable bonding thereto of a lubricant topcoat in an adequate thickness. A protective overcoat must also exhibit a suitable electrical conductivity. The absence of conductivity may result in the formation of a static charge on the surface of the magnetic recording medium leading to recording and/or reading errors. Furthermore, as the head disk interface decreases to less than 1 microinch, it is necessary to reduce the thickness of the carbon-containing protective overcoat to below the conventional thicknesses employed, e.g., about 200 Å. It is virtually impossible to satisfy such imposing requirements with a conventional protective overcoat material.

Accordingly, there exists a need for a magnetic recording medium comprising a protective overcoat capable of satisfying the imposing demands for high areal recording density and reduced head disk interface. There also exists a need for a magnetic recording medium having a protective overcoat capable of preventing corrosion of the underlying magnetic layer, preventing migration of ions from underlying layers, providing a suitable surface polarity for adequate lubricant bonding and exhibiting suitable conductivity to avoid reading and/or recording errors.

DISCLOSURE OF THE INVENTION

An object of the present invention is a magnetic recording medium comprising a thin protective overcoat capable of preventing corrosion of the underlying magnetic layer, migration of ions for underlying layers, exhibiting a suitable surface polarity for lubricant bonding and a suitable conductivity.

A further object of the present invention is a high areal recording density magnetic recording medium having a protective overcoat less than about 125 Å suitable for use in a drive system with a flying height less than about 1 microinch.

Additional objects, advantages and other features of the invention will be set forth in part in the description which follows and in part will become apparent to those having ordinary skill in the art upon examination of the following disclosure or may be learned from the practice of the invention. The objects and advantages of the invention may be realized and obtained as particularly pointed out in the appended claims.

According to the present invention, the foregoing and other objects are achieved in part by a magnetic recording medium comprising a multilayered carbon-containing protective overcoat, each layer having a different surface polarity and a different electrical conductivity.

Another aspect of the present invention is a magnetic recording medium comprising: a non-magnetic substrate; an underlayer on the non-magnetic substrate; a magnetic layer on the underlayer; a first protective overcoat on the magnetic layer, the first protective overcoat comprising hydrogenated carbon having a hydrogen concentration of about 5 at. % to about 40 at. %; a second protective overcoat on the first protective overcoat, the second protective overcoat comprising a member selected from the group consisting of graphitic carbon and amorphous carbon nitride; and a lubricant topcoat on the second protective overcoat.

Additional objects and advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
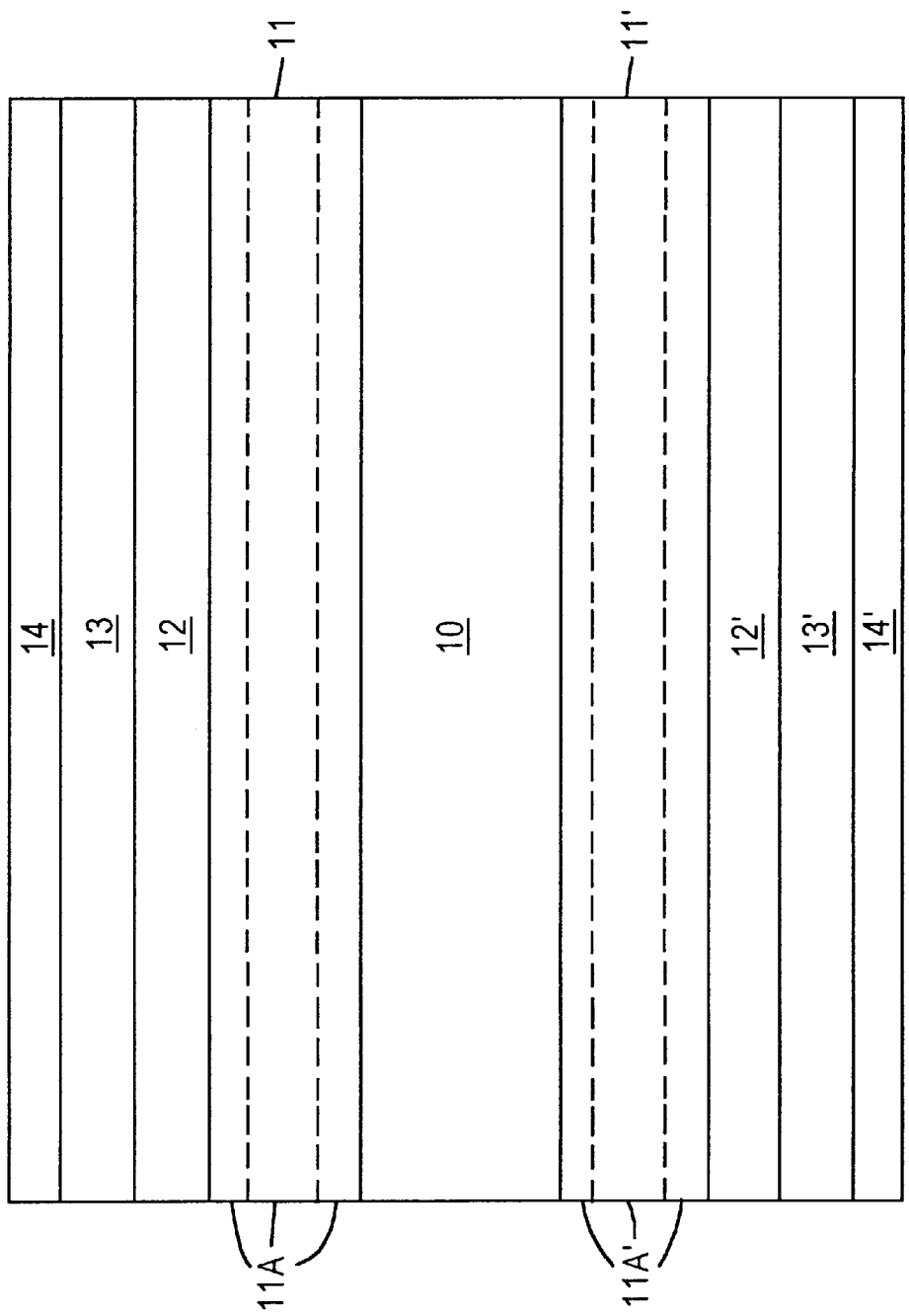
FIG. 1 schematically illustrates a conventional magnetic recording medium.

The present invention provides a composite protective overcoat for a magnetic recording medium which has an overall thickness less than about 100 Å and prevents corrosion of the underlying magnetic layer, prevents migration of ions from underlying layers, exhibits a suitable surface polarity, thereby enabling adequate bonding of a lubricant topcoat thereto at a desirable thickness, such as about 5 Å to about 10 Å, and exhibits a suitable conductivity to avoid reading and/or writing errors, i.e., a conductivity of about $10^{-8} \Omega^{-1}$ to about $10^{-4} \Omega^{-1}$. The inventive composite protective overcoat comprises a multilayered overcoat of a plurality of layers of different types of carbon-containing materials having different properties. In this way, the performance of the composite protective overcoat can be tailored by selecting appropriate carbon materials exhibiting desirable characteristics.

For example, hydrogenated carbon adequately prevents corrosion of an underlying magnetic layer and prevents migration of atoms from underlying layers. However, hydrogenated carbon exhibits poor surface polarity, i.e., poor bondability to an applied lubricant because of the passivation of the carbon dangling bonds by hydrogen which is also characterized by lower conductivity. Amorphous carbon nitride and graphitic carbon contain more band-gap states than hydrogenated carbon and, hence, exhibit higher conductivity but a favorable surface polarity with greater bonding to an applied lubricant. In accordance with an embodiment of the present invention, a composite protective overcoat is employed comprising a layer of hydrogenated carbon and a layer of amorphous carbon nitride or graphitic carbon formed on the layer of hydrogenated carbon. By strategically selecting individual layers of different materials, depending upon their specific characteristics, the inventive composite protective overcoat can be tailored for different drive programs while reducing the total thickness of the composite protective overcoat.

In an embodiment of the present invention, a magnetic recording medium is coated with a layer of hydrogenated carbon, typically containing about 5 at. % to about 40 at. % hydrogen, e.g., about 20 at. % hydrogen to about 35 at. % hydrogen. A second carbon-containing protective layer is then formed on the layer of hydrogenated carbon, such as a layer of amorphous carbon nitride having a nitrogen:hydrogen concentration ratio of about 5:20 to about 30:0. In another embodiment of the present invention, a layer of graphitic carbon is formed on a layer of hydrogenated carbon. Graphitic carbon or graphite includes the crystalline allotrope of carbon as well as the amorphous form characterized by degenerate or imperfect graphitic structures. Graphitic carbon typically does not contain substantial amounts of hydrogen or nitrogen and, consequently, there are less band-gaps states vis-à-vis amorphous carbon nitride but more band-gaps states than hydrogenated carbon. Graphitic carbon is generally softer except for $sp^3$ carbon wherein a high hardness is achieved.

Thus, the present invention enables tailoring the protective overcoat by employing strategically selected layers of materials for a plurality of layers, each layer having different properties, e.g., different amounts carbon dangling bonds, different surface polarities and different electrical conductivities. The overall thickness of the resulting composite protective overcoat is minimized while optimizing the degree of bonding of an applied lubricant, preventing corrosion of the underlying magnetic layer, and preventing migration of ions from underlying layers.

Figure 2:
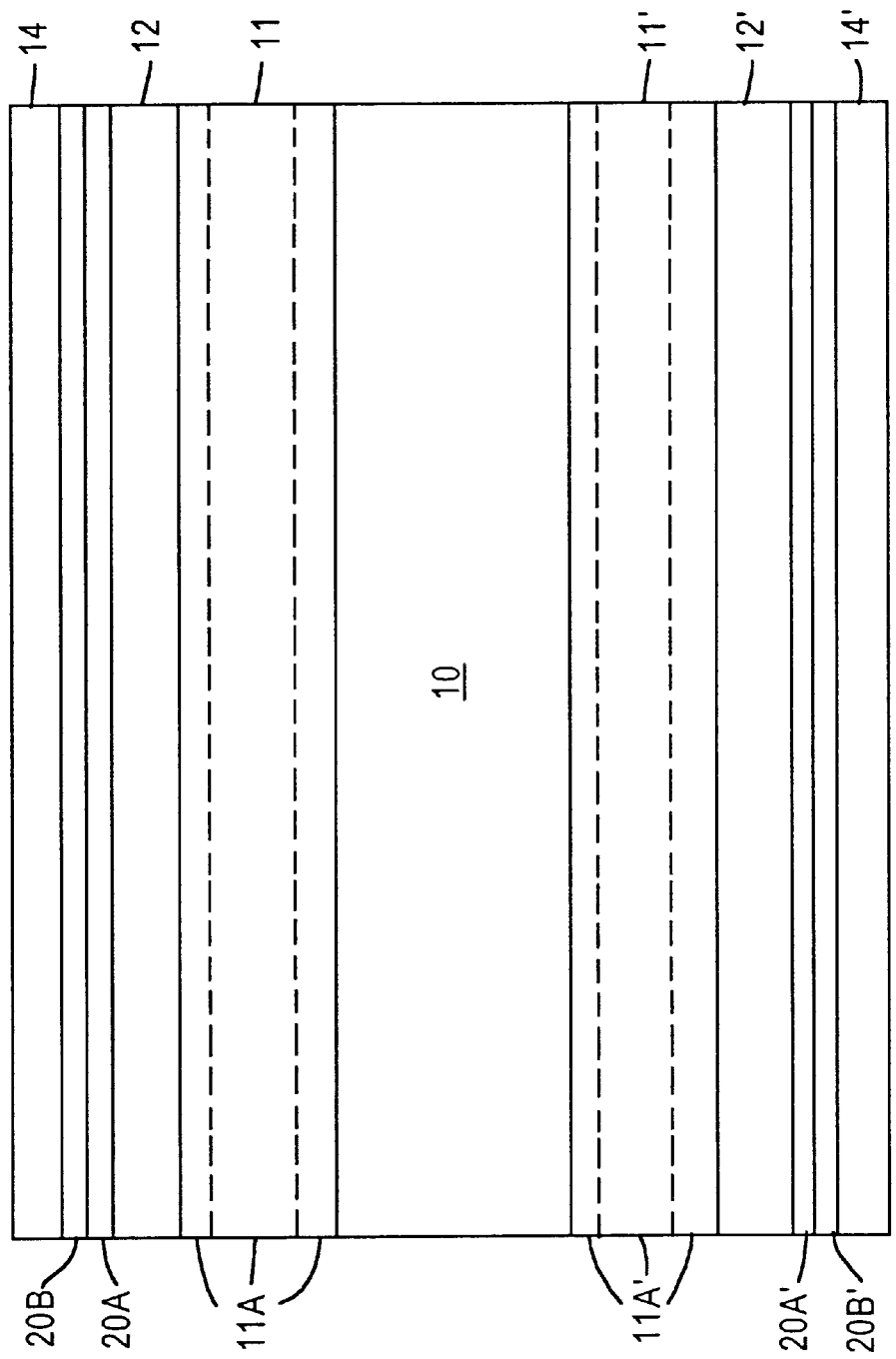
FIG. 2 schematically illustrates a magnetic recording medium in accordance with the present invention.

An embodiment of the present invention is illustrated in FIG. 2, wherein elements similar to those of the conventional magnetic recording illustrated in FIG. 1 bear similar reference numerals. As shown in FIG. 2, substrate 10 is provided sequentially, on each side thereof, with a Cr or Cr-alloy underlayer 11, 11', and a magnetic layer, such as a Co-base alloy layer 12, 12' thereon, as in the FIG. 1 magnetic recording medium. However, the magnetic recording medium in accordance with the present invention departs from the conventional magnetic recording medium illustrated in FIG. 1 in that the protective overcoat comprises a plurality of layers 20A, 20B and 20A', 20B', sequentially formed on magnetic layer 12, 12'. A lubricant topcoat 14, 14' is then applied to the second carbon-containing protective overcoat layer 20B, 20B'.

The present invention provides a magnetic recording medium comprising a composite protective overcoat having a total thickness considerably less than the thickness of the conventional protective overcoat 13, 13' which is typically about 200 Å. In accordance with the present invention, the total thickness of the inventive composite protective overcoat 20A, 20B is reduced to about 100 Å or less, e.g., 50 Å to about 70 Å. Such a reduction in thickness is achieved by the strategic selection of individual protective overcoat layers to optimize the overall performance of the composite protective overcoat. For example, hydrogenated carbon, capable of preventing corrosion of the underlying magnetic layer and migration of atoms from underlying layers is initially formed on the magnetic layer. A thin layer of graphitic carbon or amorphous carbon nitride is applied to the layer of hydrogenated carbon to enable adequate bonding of a subsequently applied lubricant layer to achieve a desired lubricant topcoat thickness of about 5 Å to about 15 Å. In addition, the conductivity of the inventive composite protective overcoat is advantageously about $10^{-8}\Omega^{-1}$ to about $10^{-4}\Omega^{-1}$.

EXAMPLE

Three Al—Mg alloy substrates plated with amorphous NiP were sequentially provided with sputter deposited layers of a Cr-alloy underlayer and a Co-base alloy magnetic layer.

Sample 1 was provided with a hydrogenated carbon protective overcoat containing about 15 at. % to about 35 at. % hydrogen at a thickness of about 150 Å.

Sample 2 was provided with a layer of hydrogenated carbon having a hydrogen concentration of about 20 at. % to about 30 at. % at a thickness of about 50 Å. A layer of graphitic carbon, having a thickness of about 100 Å, was sputter deposited in argon on the hydrogenated carbon layer. Testing revealed that Sample 2 exhibited glide noise about 3–4 times lower than that of Sample 1 and substantially high durability, i.e., better wear performance, than Sample 1.

A lubricant topcoat layer was applied to Sample 1 and to Sample 2 under substantially the same conditions. Testing revealed that the lubricant topcoat bonded to Sample 2 had a thickness of about 8 Å; whereas, the thickness of the lubricant topcoat bonded to Sample 1 was about 4 Å.

Further testing revealed that the stiction measured from CSS, including stressed CSS performance, and corrosion performance of Sample 2 was comparable to those of Sample 1; however, the conductivity of Sample 2 was about $10^{-6}\Omega^{-1}$, while the conductivity of Sample 1 was about $10^{-8}\Omega^{-1}$. Sample 2, having a composite protective overcoat thickness of about 1soA, is particularly suitable for non-proximity applications, i.e., a head disk interface of 1 microinch or greater.

A layer of amorphous carbon nitride, having a thickness of about 50 Å, was deposited on Sample 3 with about 60 Å hydrogenated carbon having a hydrogen concentration of about 20 at. % to about 30 at. %. Sample 3 exhibited effective corrosion resistance, and significantly reduced head smear vis-à-vis Sample 1. Sample 3, having a composite protective overcoat thickness of about 110 Å, is particularly suitable for proximity applications wherein the head disk interface is less than about 1 microinch.

The above testing demonstrates that a composite of plural strategically selected and positioned layers of different materials enables the use of a composite protective overcoat having an overall thickness less than the thickness of a single carbon-containing protective overcoat while achieving superior performance. Thus, the present invention enables the formation of a composite protective overcoat wherein the properties are fine tuned for a particular drive programs at a total carbon thickness less than that conventionally employed with a single carbon-containing layer.

The present invention can be employed to produce any various types of magnetic recording media, including thin film disks. The present invention is particularly applicable and produce a high areal recording density magnetic recording media requiring a low flying height.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A magnetic recording medium comprising:

a magnetic layer;

a first hydrogenated carbon protective overcoat, directly on the magnetic layer, having a hydrogen concentration of about 5 at. % to about 40 at. %; and a second protective overcoat on the first protective overcoat, the second protective overcoat consisting essentially of graphitic carbon.

2. The magnetic recording medium according to claim 1, wherein the composite first and second protective overcoats has a conductivity of about $10^{-8}\Omega^{-1}$ to about $10^{-4}\Omega^{-1}$.

3. The magnetic recording medium according to claim 1, wherein the first protective overcoat has a hydrogen concentration of about 15 at. % to about 35 at. %.

4. The magnetic recording medium according to claim 1, wherein the second protective overcoat consists of graphitic carbon.

5. The magnetic recording medium according to claim wherein the first and second protective overcoats have a combined thickness of about 150 Å or less.

6. The magnetic recording medium according to claim 5, wherein:

the first protective overcoat has a thickness of about 20 Å to about 75 Å; and the second protective overcoat has a thickness of about 55 Å to about 75 Å.

7. The magnetic recording medium according to claim 5, wherein the first and second protective overcoats have a combined thickness of about 50 Å to about 75 Å.

8. The magnetic recording medium according to claim 7, wherein:

the first protective overcoat has a thickness of about 20 Å to about 30 Å; and the second protective overcoat has a thickness of about 45 Å to about 55 Å.

9. The magnetic recording medium according to .claim 1, comprising:

a non-magnetic substrate;

at least one underlayer on the non-magnetic substrate;

a magnetic layer on the underlayer;

the first protective overcoat on the magnetic layer;

the second protective overcoat on the first protective overcoat; and a lubricant topcoat bonded to the second protective overcoat.

10. The magnetic recording medium according to claim 9, wherein the lubricant topcoat has a thickness of about 10 Å to about 25 Å.

11. A magnetic recording medium, comprising:

a non-magnetic substrate;

at least one underlayer on the non-magnetic substrate;

a magnetic layer on the underlayer;

a first protective overcoat directly on the magnetic layer, the first protective overcoat comprising hydrogenated carbon having a hydrogen concentration of about 5 at. % to about 40 at. %;

a second protective overcoat on the first protective overcoat, the second protective overcoat consisting essentially of graphitic carbon; and a lubricant topcoat on the second protective overcoat.

12. The method according to claim 11, wherein the first protective overcoat has a hydrogen concentration of about 15 at. % to about 35 at. %.

13. The magnetic recording medium according to claim 11, wherein the second protective overcoat consists of graphitic carbon.

14. The magnetic recording medium according to claim 11, wherein the first and second protective overcoats have a combined thickness of about 150 Å or less.

15. The magnetic recording medium according to claim 14, wherein:

the first protective overcoat has a thickness of about 20 Å to about 75 Å; and the second protective overcoat has a thickness of about 55 Å to about 75 Å.

16. The magnetic recording medium according to claim 14, wherein the combined thickness of the first and second protective overcoat is about 50 Å to about 75 Å.

17. The magnetic recording medium according to claim 16, wherein:

the first protective overcoat has a thickness of about 20 Å to about 30 Å; and the second protective overcoat has a thickness of about 45 Å to about 55 Å.

18. The magnetic recording medium according to claim 11, wherein the thickness of the lubricant topcoat is about 10 Å to about 25 Å.

19. The magnetic recording medium according to claim 11, wherein the composite first and second protective overcoats has a conductivity of about $10^{-8}\Omega^{-1}$ to about $10^{-4}\Omega^{-1}$.

* * * * *